United States Patent
Böser et al.

(10) Patent No.: US 11,404,908 B2
(45) Date of Patent: Aug. 2, 2022

(54) SYSTEM FOR CONTACTLESSLY TRANSMITTING ELECTRICAL ENERGY TO A MOBILE PART WHICH CAN BE MOVED ON THE FLOOR OF A SYSTEM

(71) Applicant: SEW-EURODRIVE GMBH & CO. KG, Bruchsal (DE)

(72) Inventors: Andreas Böser, Bruchsal (DE); Thomas Krempel, Hambrücken (DE); Björn Egger, Bruchsal (DE); Nils-Malte Jahn, Heidelberg (DE)

(73) Assignee: SEW-EURODRIVE GMBH & CO. KG, Bruchsal (DE)

( * ) Notice: Subject to any disclaimer, the term of this patent is extended or adjusted under 35 U.S.C. 154(b) by 116 days.

(21) Appl. No.: 16/761,447

(22) PCT Filed: Oct. 18, 2018

(86) PCT No.: PCT/EP2018/025269
§ 371 (c)(1),
(2) Date: May 4, 2020

(87) PCT Pub. No.: WO2019/086143
PCT Pub. Date: May 9, 2019

(65) Prior Publication Data
US 2020/0395783 A1 Dec. 17, 2020

(30) Foreign Application Priority Data
Nov. 3, 2017 (DE) ...................... 10 2017 010 217.1

(51) Int. Cl.
*H02J 50/00* (2016.01)
*H02J 50/10* (2016.01)
*B60L 53/12* (2019.01)
*B60L 53/30* (2019.01)
*E04F 15/024* (2006.01)

(52) U.S. Cl.
CPC ............ *H02J 50/005* (2020.01); *B60L 53/12* (2019.02); *H02J 50/10* (2016.02); *B60L 53/30* (2019.02); *E04F 15/02452* (2013.01)

(58) Field of Classification Search
CPC .......... H02J 7/0042; H02J 7/02; H02J 50/005; H02J 50/10; H02J 50/90; H02J 2207/20; H01F 27/28; H01F 27/02; H01F 27/40; H01F 38/14; H02G 3/22
USPC .......................................................... 320/108
See application file for complete search history.

(56) References Cited

U.S. PATENT DOCUMENTS

| 9,662,993 | B2 | 5/2017 | Niizuma |
| 10,965,155 | B2 * | 3/2021 | Jahn ...................... H02J 50/005 |
| 11,101,692 | B2 * | 8/2021 | Soder ..................... H02J 50/005 |
| 2009/0295223 | A1 | 12/2009 | Bauer et al. |
| 2014/0117930 | A1 | 5/2014 | Imazu et al. |

(Continued)

FOREIGN PATENT DOCUMENTS

| CA | 2081764 A1 | 10/1991 |
| CN | 103795131 A | 5/2014 |

(Continued)

*Primary Examiner* — Paul Dinh
(74) *Attorney, Agent, or Firm* — Carter, DeLuca & Farrell LLP

(57) ABSTRACT

A system for non-contact transmission of electrical energy to a mobile part has a double floor in which a primary part is situated.

18 Claims, 5 Drawing Sheets

(56) References Cited

U.S. PATENT DOCUMENTS

| | | | |
|---|---|---|---|
| 2015/0167340 A1* | 6/2015 | Niizuma | E04H 6/22 |
| | | | 414/231 |
| 2015/0188357 A1 | 7/2015 | Chen et al. | |
| 2016/0236577 A1* | 8/2016 | Krammer | H01F 38/14 |

FOREIGN PATENT DOCUMENTS

| | | |
|---|---|---|
| CN | 104521104 A | 4/2015 |
| DE | 102009057437 A1 | 6/2011 |
| DE | 102014000347 A1 | 7/2015 |
| EP | 2842866 A1 | 3/2015 |
| GB | 2529197 A | 2/2016 |
| JP | H09268739 A | 10/1997 |
| KR | 20120061268 A | 6/2012 |
| KR | 20160135609 A | 11/2016 |

* cited by examiner

SYSTEM FOR CONTACTLESSLY TRANSMITTING ELECTRICAL ENERGY TO A MOBILE PART WHICH CAN BE MOVED ON THE FLOOR OF A SYSTEM

FIELD OF THE INVENTION

The present invention relates to a system for non-contact transmission of electrical energy to a mobile part.

BACKGROUND INFORMATION

In certain conventional systems, electrical energy is supplied to an energy store of a mobile part with the aid of a stationary primary winding through inductive coupling.

SUMMARY

Example embodiments of the present invention provide a system for a non-contact transmission of energy that is easy to manufacture.

According to an example embodiment of the present invention, a system is provided for a non-contact transmission of electrical energy to a mobile part, and includes a double floor in which a primary part is situated.

This offers the advantage that a primary part is able to be placed in a double floor. A particularly uncomplicated conversion is therefore possible. For if the primary part is to be rearranged at a different location of the double floor, it is very easy to route the supply cables in the double floor to the other location, i.e. to relocate them appropriately, and to install the primary part at this other location, that is to say, to remove a correspondingly situated floor panel and to install a floor panel provided with the primary part.

According to example embodiments, the double floor has a first floor panel and second floor panels, carrier elements, supports and an unfinished floor. The floor panels are accommodated by carrier elements, in particular carrier elements that form a subfloor, the carrier elements being held above an unfinished floor with the aid of supports. This has the advantage that the first floor panel instead of a respective second floor panel may be put in place. The reason for this is that the receptacle for the respective second floor panel may also be used as a receptacle for the first floor panel. The intersection defined for the second floor panels thus also fits the first floor panel. The intersection is defined by the geometrical dimensions of the receptacle, i.e. the receiving region of the support elements of the subfloor.

According to example embodiments, the supports and carrier elements are made of metal, in particular made of steel. This has the advantage of providing a high load-bearing capacity. It is therefore also possible to produce the first floor panel from metal instead of wood, and/or to provide the first floor panel with a primary part and/or a feeder device.

According to example embodiments, the first floor panel is made of aluminum. This is considered advantageous insofar as an excellent distribution of the heat flow generated by the primary part is achievable. This ensures an excellent dissipation of the heat into the environment, in particular also by the supports and/or the carrier elements.

According to example embodiments, a receiving ring, ribs and a frame, in particular a circumferential and/or closed frame, are formed on the underside of the first floor panel. The ribs, for example, extend from the receiving ring in the form of a star in the radial direction toward the frame. This offers the advantage that stiffening is able to be achieved, which means that a greater carrying capacity is realizable.

Thus, it is even possible to position or attach a feeder device on or to the primary part.

According to example embodiments, the receiving ring is set apart from the frame. This has the advantage that only the inner receiving ring and the outer frame as well as the connecting ribs rather than the entire first floor panel have to be given a thicker configuration, whereas the remaining first floor panel may be produced using a minimum of material.

According to example embodiments, the ribs are set apart from one another at regular intervals in the circumferential direction. This is considered advantageous insofar as a balanced capacity utilization is achievable.

According to example embodiments, the supports are arranged to be modifiable in length, each support in particular having two support parts which are connected to each other by screws. This offers the advantage that the unfinished floor is adaptable and uneven regions of the unfinished floor may thus be compensated for, with the result that the first and the second floor panels provide on their upper sides a highly precise planar travel surface for the mobile part.

According to example embodiments, the primary part has a receiving part and an upper part, the upper part being accommodated in the receiving part, and a primary winding being situated in the upper part. This offers the advantage that the upper part is able to be produced from a non-magnetic material such as plastic and the receiving part may be produced from metal. This makes it possible to rapidly dissipate heat from the receiving part into the environment. Nevertheless, the magnetic field generated by the primary winding freely penetrates the non-magnetic material of the upper part.

According to example embodiments, the upper part is made from plastic. This has the advantage that the magnetic field generated by the primary winding situated within the upper part or on the upper part freely penetrates the upper part and thus induces voltage in the secondary winding without significant losses.

According to example embodiments, the receiving part is made of aluminum. This offers the advantage that magnetic shielding from the lower region of the double floor is able to be provided. As a result, the steel parts such as supports and carrier parts are magnetically shielded from the space region in which the primary winding is situated.

According to example embodiments, the receiving ring holds the primary part, in particular, the receiving part. This not only has the advantage that the receiving part induces the magnetic shielding from the lower region of the double floor but it also spreads and discharges the lost heat of the primary winding. It is considered particularly advantageous in this context that the receiving part is accommodated by the receiving ring and is therefore in physical contact with the receiving ring. The heat flow crossing this heat transition featuring excellent heat conduction is then conveyed through the ribs and the frame and also through the carrier elements and supports. A large thermal capacity is therefore connected to the receiving ring in a heat-conducting manner, and the heat introduced into the receiving ring is distributed and dissipated into the environment via the thermal capacity.

According to example embodiments, the upper part has a primary winding, the primary winding in particular being integrated into the upper part. This is considered advantageous insofar as a high integration density is achievable and a compact solution is therefore able to be produced. In addition, the upper part is able to be produced from plastic so that the magnetic fields generated by the primary winding are freely conductible.

According to example embodiments, a feeder device is situated on the primary part. The feeder device is supplied with the aid of a cable and includes a converter, which is connected via its connection on the alternating voltage side to a quadripole arranged as a gyrator, whose components such as a capacitor and inductivity are resonantly adapted to the frequency of the alternating voltage supplied at the connection on the alternating voltage side. The output side of the quadripole feeds the primary winding. This offers the advantage that the first floor panel is arranged to provide a high carrying capacity as a result of its stiffening measures, i.e., forming a frame, forming ribs and forming an inner receiving ring.

Further features and aspects of example embodiments of the present invention are described in greater detail with reference to the appended Figures.

DETAILED DESCRIPTION

Figure 1:
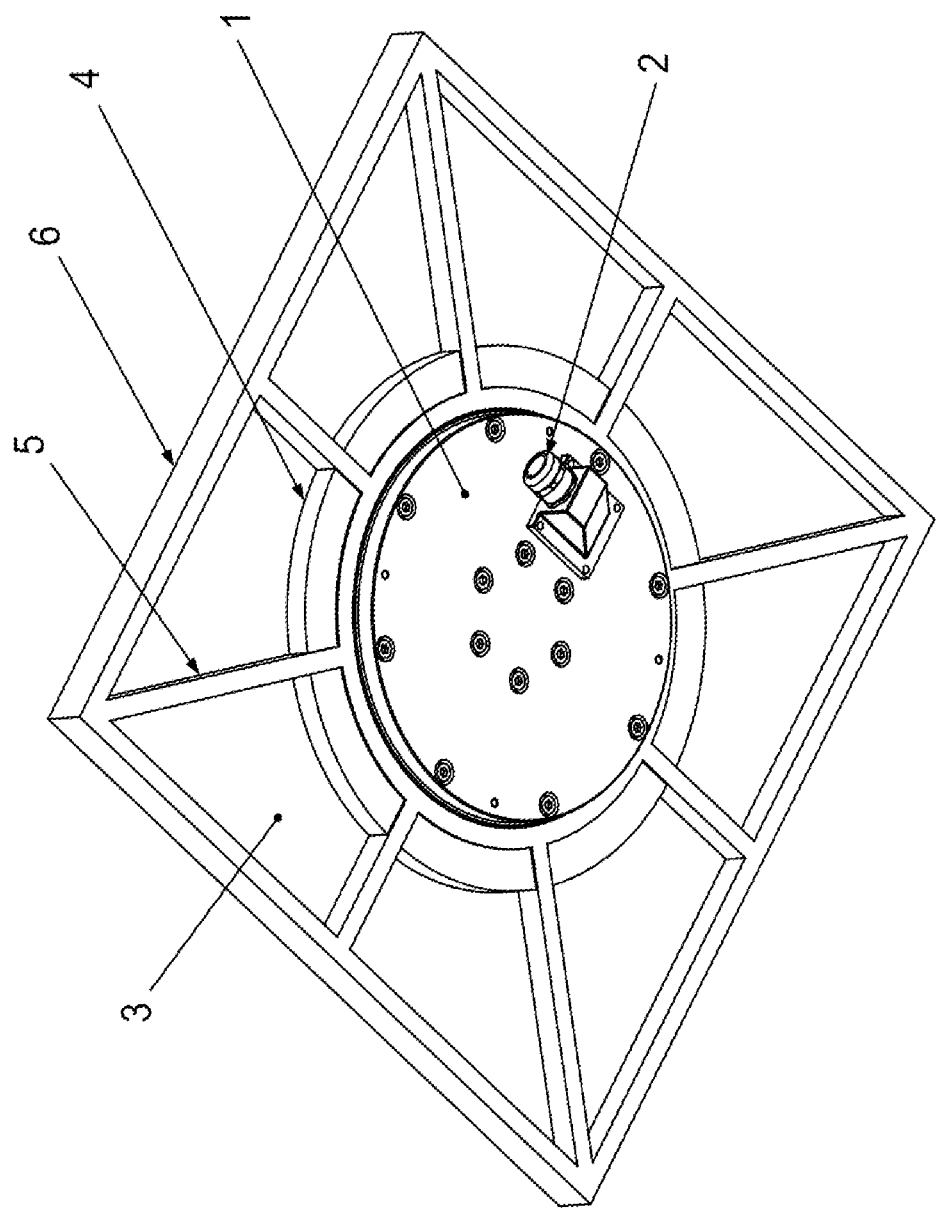
FIG. 1 is a schematic perspective view of a first floor panel 3 of a system according to an example embodiment of the present invention for an inductive energy transmission, including a double floor.

As schematically illustrated in the Figures, the double floor has second floor panels 20, which are accommodated in carrier elements 21 forming a subfloor and thus form the floor on which a mobile part is able to drive.

Second floor panels 20 are arranged in a regular fashion and accommodated by respective carrier elements 21, which are held above an unfinished floor 23 with the aid of supports 22 that are adjustable in length. This allows for a precise alignment of second floor panels 20.

For example, second floor panels 20 are at least partially made from a non-metallic material such as wood, plastic and/or plaster.

At one location, one of second floor panels 20 is replaced by a first floor panel 3. This first floor panel 3 is, for example, made of metal, especially aluminum, and on its underside is provided with reinforcements, which are arranged as a receiving ring 4, ribs 5 and as frame 6. The carrying capacity of first floor panel 3 is therefore very high. This is so because frame 6 is arranged in the outer circumferential region of the first floor panel and receiving ring 4 is arranged within this frame 6, and ribs connect frame 6 to receiving ring 4.

A recess, which penetrates first floor panel 3 and accommodates a primary part 1, is provided in the center of receiving ring 4.

The primary part has an integrated primary winding to which an alternating current may be applied.

A mobile part, in particular a vehicle or an automatically guided mobile part, which is able to travel on the floor, has on its underside a secondary winding, which is able to be inductively coupled with the primary winding of primary part 1.

The induced voltage is rectified in the mobile part and feeds an energy store of the mobile part.

A feeder device 24, which is equipped with a converter for this purpose, supplies the primary winding, the converter supplying an alternating voltage which feeds a gyrator whose components such as capacitors and inductivities are resonantly adapted to the frequency of the alternating voltage. The voltage-source-type behavior of the output side of the converter is therefore converted into a current-source-type behavior of the output side of the gyrator. The primary winding is fed either directly from the output side of the gyrator or via a transformer.

Primary part 1 is screwed to first floor panel 3 or to a carrier element 21 accommodating first floor panel 3.

A cable feed 2 is situated on the underside of the primary part so that an alternating current is able to be supplied from the direction of the underside to the primary winding.

Figure 2:
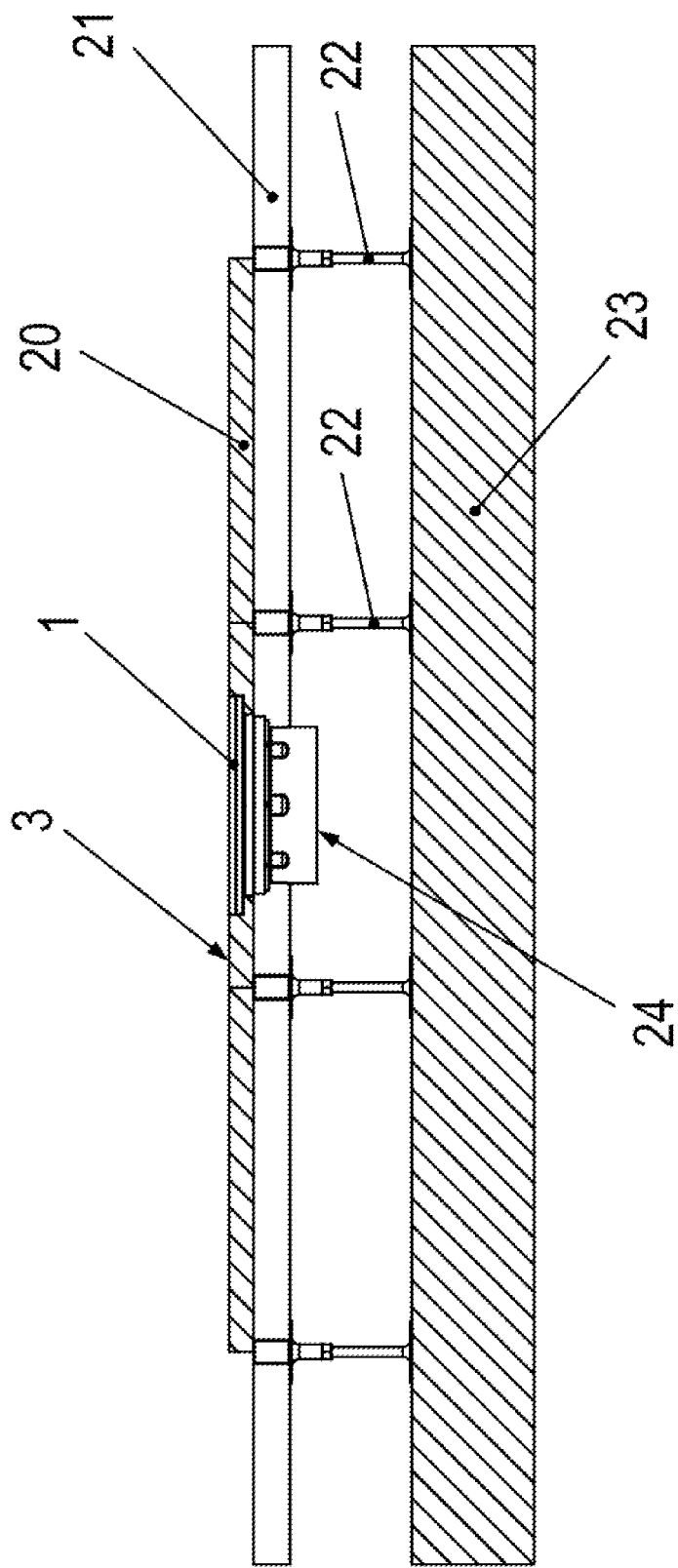
FIG. 2 is a schematic cross-sectional view through the double floor, a feeder device 24 being situated on a primary part 1 situated in first floor panel 3.
Figure 3:
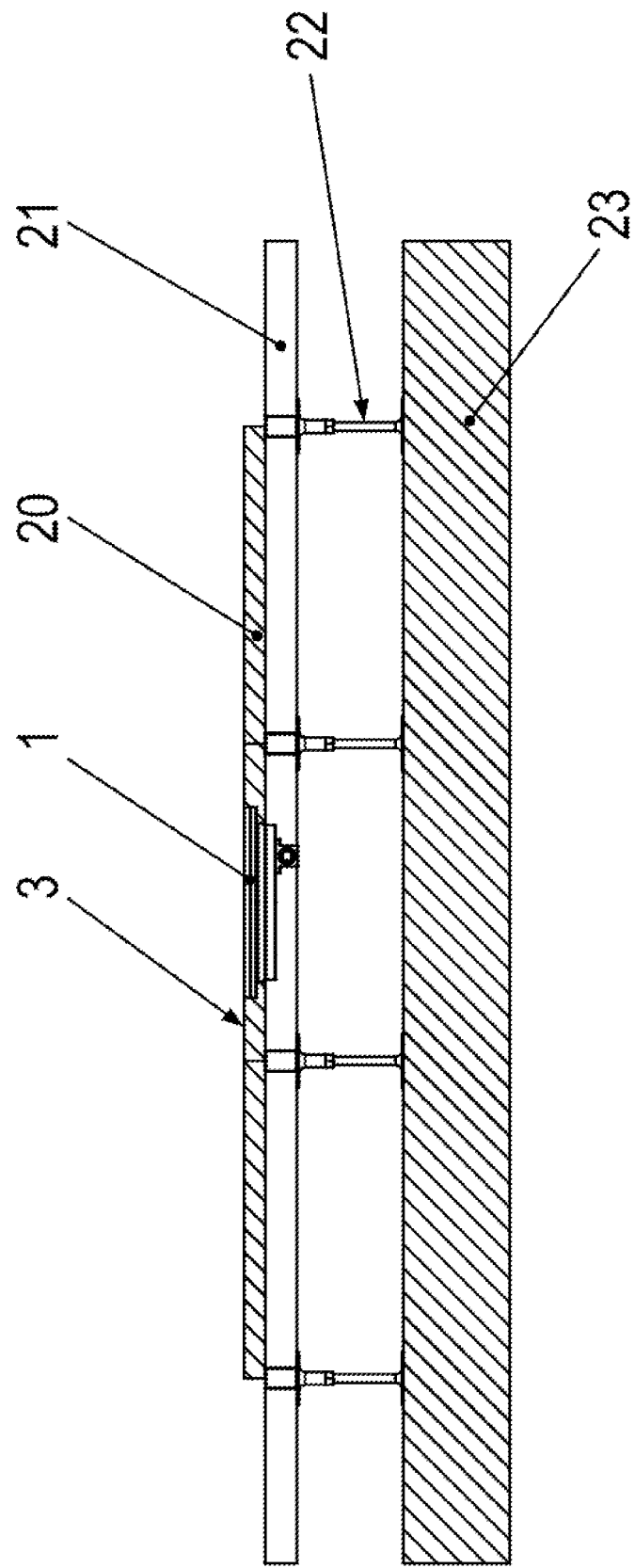
FIG. 3 is a schematic cross-sectional view through the double floor without feeder device 24.
Figure 4:
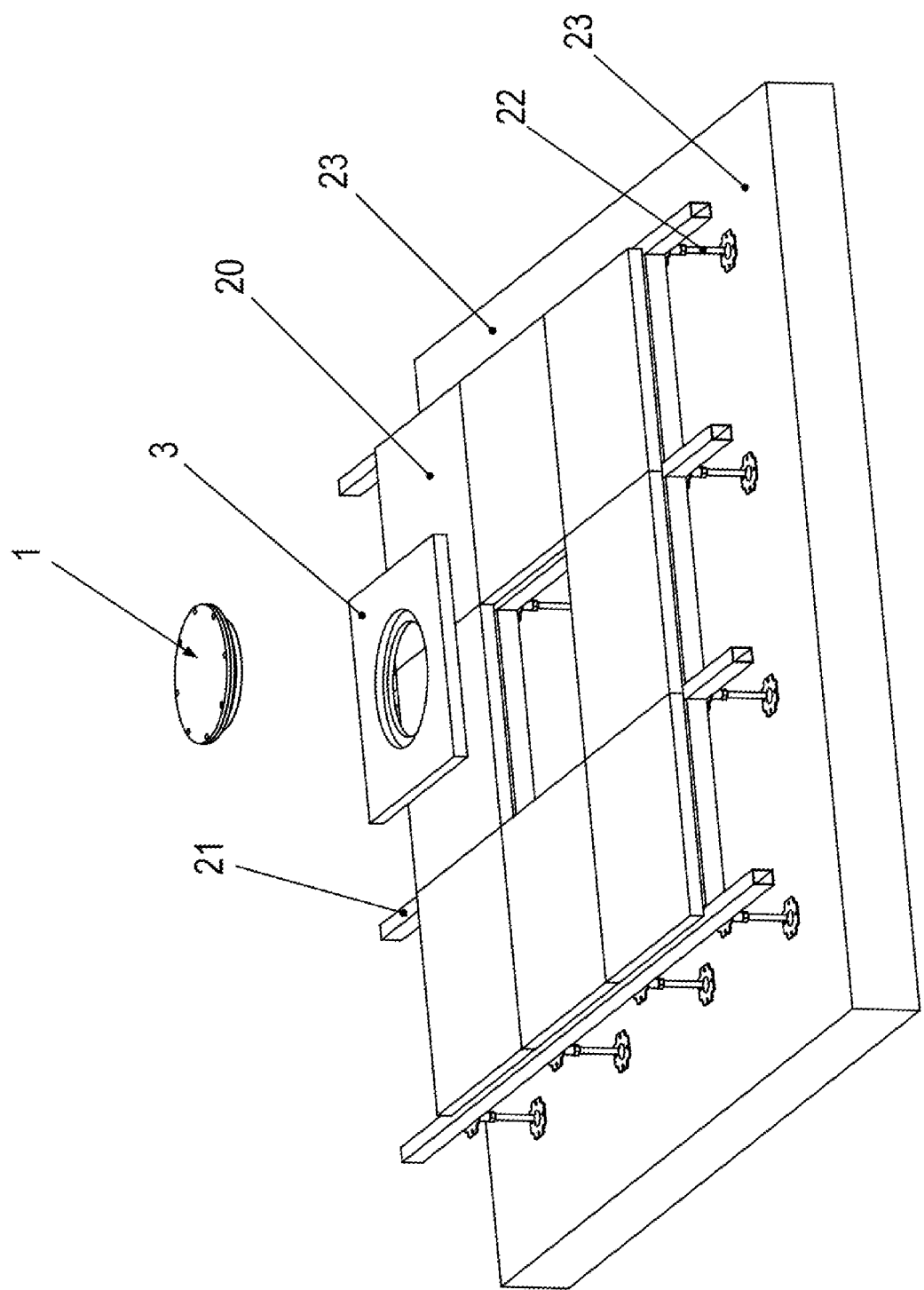
FIG. 4 is a schematic exploded perspective view of the double floor, first floor panel 3 together with primary part 1.
Figure 5:
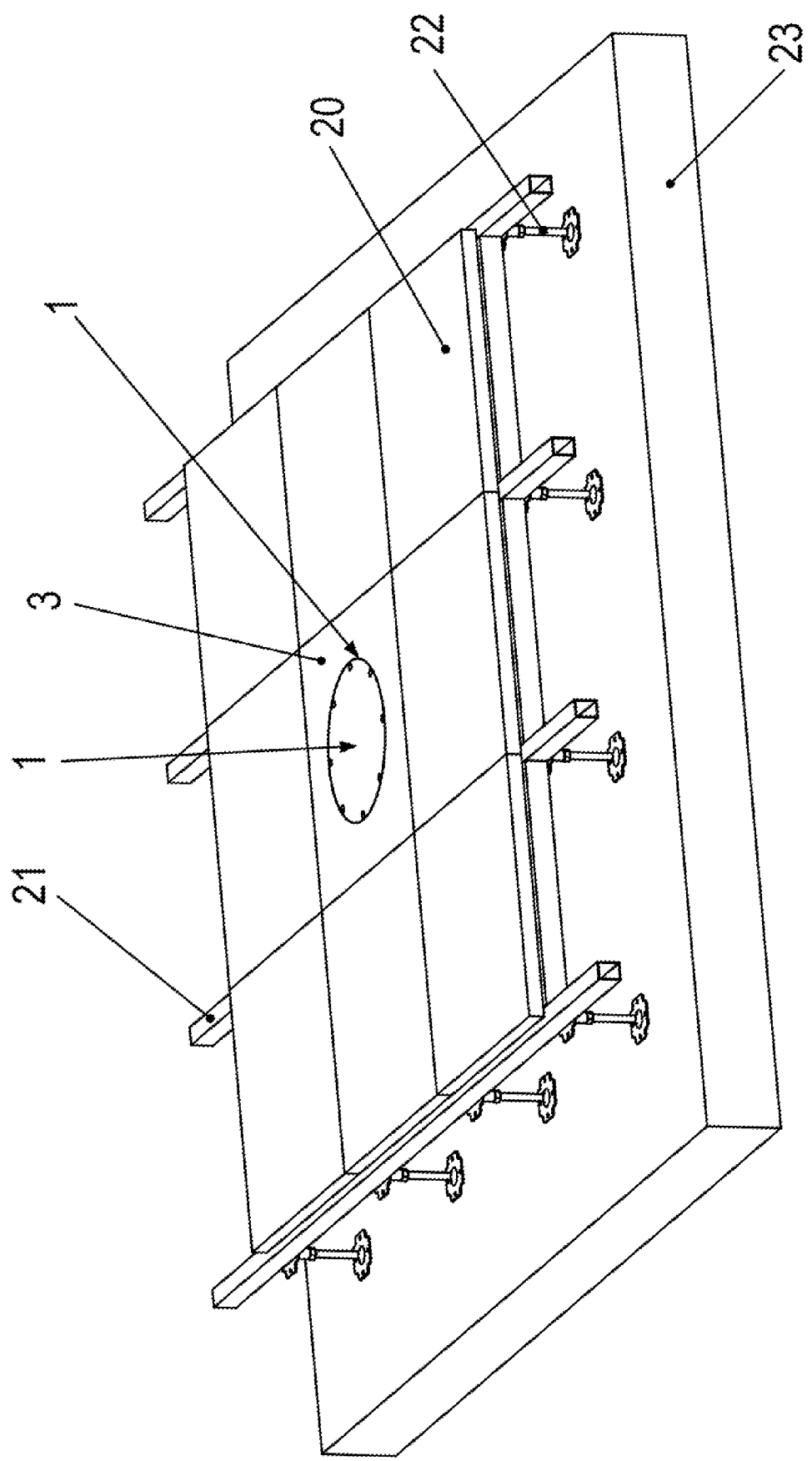
FIG. 5 is a schematic perspective view of the double floor with an installed first floor panel 3.

In the direct mounting of feeder device 24 on the underside of primary part 1 as illustrated in FIG. 2, a direct supply of alternating current is able to be carried out, alternatively, in particular, also using a plug-in connection between primary part 1 and feeder device 24.

Primary part 1 and/or feeder device 24 is/are at least partially provided with a metallic housing-forming part, i.e., a housing part, at their respective outer circumference. A thermally conductive connection thus exists between primary part 1 and first floor panel 3. A heat transfer to first floor panel 3 via the primary part is also provided in the case of a directly mounted feeder device. This means that first floor panel 3 is also used for spreading the heat and for dissipating it into the environment. In addition, a portion of the heat flow is also spread and dissipated via carrier elements 21 since the carrier elements are produced from metal.

Because supports 22 are also produced from metal, the heat is able to be spread and dissipated in this manner as well. The length of supports 22 is adjustable.

The upper side of primary part 1 is connected to the upper side of first floor panel 3 in a flush manner. This makes it possible for the mobile part, in particular the wheels of the mobile part, to drive freely across it.

In addition, the use of aluminum has a magnetically shielding effect with regard to the alternating magnetic fields that are induced by the primary winding.

The upper side of the primary part is made of plastic. The magnetic field generated by the primary part thus reaches the secondary winding without obstruction.

The housing of the primary part may be constructed from multiple parts, in which case a metallic receiving part accommodates an upper part made of plastic. The receiving part is accommodated in the receiving ring and connected in a manner that provides excellent heat conduction by the metal-to-metal connection provided in this manner.

Ribs 5 extend from receiving ring 4 in the form of a star, i.e., all in the radial direction, toward frame 6.

Ribs 5 are set apart from one another at regular intervals in the circumferential direction.

LIST OF REFERENCE NUMERALS 1 primary part
2 cable feed
3 first floor panel, in particular receiving panel
4 receiving ring 5 rib
6 frame
20 second floor panel
21 carrier element, subfloor
22 support
23 unfinished floor
24 feeder device

The invention claimed is:

1. A system for contactlessly transmitting electrical energy to a mobile part, comprising:
a double floor; and
a primary part arranged in the double floor;
wherein the double floor includes a first floor panel and second floor panels, carrier elements, supports and an unfinished floor, the floor panels being accommodated by (a) carrier elements and/or (b) carrier elements that form a subfloor, the carrier elements being held above an unfinished floor by supports.

2. The system according to claim 1, wherein the supports and the carrier elements are formed of metal and/or steel.

3. The system according to claim 1, wherein the first floor panel is formed of aluminum.

4. The system according to claim 1, wherein a receiving ring, ribs, and a frame are arranged on an underside of the first floor panel.

5. The system according to claim 4, wherein the frame is arranged as a circumferential frame and/or closed frame, and the ribs extend from the receiving ring in the form of a star in a radial direction toward the frame.

6. The system according to claim 4, wherein the receiving ring is set apart from the frame.

7. The system according to claim 4, wherein the ribs are set apart from one another at regular intervals in a circumferential direction.

8. The system according to claim 4, wherein the receiving ring holds the primary part and/or a receiving part of the primary part, the primary part including an upper part accommodated in the receiving part, a primary winding being arranged in the upper part.

9. The system according to claim 1, wherein the supports are modifiable in length.

10. The system according to claim 9, wherein each support includes two support parts connected to each other by screws.

11. A system for contactlessly transmitting electrical energy to a mobile part, comprising:
a double floor; and
a primary part arranged in the double floor;
wherein the primary part has a receiving part and an upper part, the upper part being accommodated in the receiving part, and a primary winding being arranged in the upper part.

12. The system according to claim 11, wherein the upper part is formed of plastic, and/or the receiving part is formed of aluminum.

13. The system according to claim 11, wherein the upper part has a primary winding and/or the primary winding is integrated into the upper part.

14. The system according to claim 11, wherein a feeder device is arranged on the primary part, the feeder device adapted to be supplied by a cable and including a converter connected via a connection on an alternating voltage side to a quadripole arranged as a gyrator having components resonantly adapted to a frequency of the alternating voltage supplied at the connection on the alternating voltage side, an output side of the quadripole adapted to feed the primary winding.

15. The system according to claim 14, wherein the components include a capacitor and an inductivity.

16. A system for contactlessly transmitting electrical enemy to a mobile part, comprising:
a double floor;
a primary part arranged in the double floor;
a frame part adapted to be located on a step of a stepped bore provided in a floor material of a floor, the mobile part being movable on the floor;
a charge unit accommodated by the frame part and including a receiver part arranged between an upper cover part and a lower cover part;
a primary winding provided on an inner side of the upper cover part and adapted to be fed by an electronic circuit supplied with electrical energy via a cable; and
a cable-routing part adapted to at least partially accommodate the cable and arranged in a groove having a radial extension in relation to the stepped bore, the groove adapted to be guided through the step of the stepped bore, the cable being routable underneath the step of the stepped bore;
wherein, in a first region in which the cable-routing part is accommodated, the groove is broader, in a circumferential direction, than in a radially more remote second region, a radial distance range covered by the second region being greater than a radial distance range covered by the first range, the groove being arranged in the second region above the step.

17. A system for contactlessly transmitting electrical energy to a mobile part, comprising:
a double floor; and
a primary part arranged in the double floor;
wherein the double floor includes a first floor panel and second floor panels, carrier elements, supports and an unfinished floor, the floor panels being accommodated by (a) carrier elements and/or (b) carrier elements that form a subfloor, the carrier elements being held above an unfinished floor by supports;
wherein the supports and the carrier elements are formed of steel;
wherein the first floor panel is formed of aluminum;
wherein a receiving ring, ribs, and a frame are arranged on an underside of the first floor panel;
wherein the frame is arranged as a circumferential frame and/or closed frame, and the ribs extend from the receiving ring in the form of a star in a radial direction toward the frame;
wherein the receiving ring is set apart from the frame;
wherein the primary part has a receiving part and an upper part, the upper part being accommodated in the receiving part, and a primary winding being arranged in the upper part; and
wherein the upper part is formed of plastic, and/or the receiving part is formed of aluminum.

18. A system for contactlessly transmitting electrical energy to a mobile part, comprising:
a double floor; and
a primary part arranged in the double floor;
wherein the double floor includes a first floor panel and second floor panels, carrier elements, supports and an unfinished floor, the floor panels being accommodated by (a) carrier elements and/or (b) carrier elements that form a subfloor, the carrier elements being held above an unfinished floor by supports;
wherein the supports and the carrier elements are formed of steel;
wherein the first floor panel is formed of aluminum;

wherein a receiving ring, ribs, and a frame are arranged on an underside of the first floor panel;

wherein the frame is arranged as a circumferential frame and/or closed frame, and the ribs extend from the receiving ring in the form of a star in a radial direction toward the frame;

wherein the receiving ring is set apart from the frame;

wherein the primary part has a receiving part and an upper part, the upper part being accommodated in the receiving part, and a primary winding being arranged in the upper part; and wherein the upper part is formed of plastic, and/or the receiving part is formed of aluminum.

\* \* \* \* \*